US009100429B2

(12) United States Patent
Lee et al.

(10) Patent No.: US 9,100,429 B2
(45) Date of Patent: Aug. 4, 2015

(54) APPARATUS FOR ANALYZING VULNERABILITY OF WIRELESS LOCAL AREA NETWORK

(71) Applicant: Electronics and Telecommunications Research Institute, Daejeon (KR)

(72) Inventors: Sok-Joon Lee, Daejeon (KR); Hyeok-Chan Kwon, Daejeon (KR); Gae-Il An, Daejeon (KR); Byung-Ho Chung, Daejeon (KR); Sin-Hyo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 23 days.

(21) Appl. No.: 14/033,654

(22) Filed: Sep. 23, 2013

(65) Prior Publication Data
US 2014/0245441 A1  Aug. 28, 2014

(30) Foreign Application Priority Data

Feb. 22, 2013 (KR) ........................ 10-2013-0019325

(51) Int. Cl.
*H04L 29/06* (2006.01)
*H04W 12/12* (2009.01)
*H04W 84/12* (2009.01)

(52) U.S. Cl.
CPC ............ *H04L 63/1433* (2013.01); *H04W 12/12* (2013.01); *H04L 63/1408* (2013.01); *H04L 63/1441* (2013.01); *H04L 63/1458* (2013.01); *H04W 84/12* (2013.01)

(58) Field of Classification Search
CPC ............ H04L 63/1408; H04L 63/1416; H04L 63/1433; H04L 63/1441; H04L 63/1458; G06F 21/56; G06F 21/577; H04W 12/12; H04W 84/12
USPC ...................................................... 726/22, 23
See application file for complete search history.

(56) References Cited

U.S. PATENT DOCUMENTS

| 2006/0230450 | A1* | 10/2006 | Bu et al. ........................... 726/22 |
| 2007/0097904 | A1* | 5/2007 | Mukherjee et al. ............ 370/328 |
| 2007/0142030 | A1* | 6/2007 | Sinha et al. .................... 455/410 |
| 2007/0192870 | A1 | 8/2007 | Lynn et al. |
| 2008/0043686 | A1* | 2/2008 | Sperti et al. ................... 370/338 |
| 2010/0100930 | A1* | 4/2010 | King ................................. 726/1 |
| 2012/0066764 | A1* | 3/2012 | Kim ................................ 726/22 |

FOREIGN PATENT DOCUMENTS

KR     10-0520103     10/2005

* cited by examiner

*Primary Examiner* — Matthew Smithers
(74) *Attorney, Agent, or Firm* — Kile Park Reed & Houtteman PLLC

(57) ABSTRACT

Disclosed herein is an apparatus for analyzing the vulnerability of a wireless local area network (LAN). The apparatus includes a collection unit, an analysis unit, and an attack unit. The collection unit collects packets transmitted and received in a wireless LAN service. The analysis unit analyzes the state of a network using the collected packets. The attack unit makes a wireless attack against an attack target using the state of the network, and controls the mode switching of a device driver based on an operating mode.

18 Claims, 3 Drawing Sheets

APPARATUS FOR ANALYZING VULNERABILITY OF WIRELESS LOCAL AREA NETWORK

CROSS REFERENCE TO RELATED APPLICATION

This application claims the benefit of Korean Patent Application No. 10-2013-0019325, filed on Feb. 22, 2013, which is hereby incorporated by reference in its entirety into this application.

BACKGROUND OF THE INVENTION

1. Technical Field

The present invention relates generally to an apparatus for analyzing the vulnerability of a wireless Local Area Network (LAN) and, more particularly, to technology that provides a method in which the administrator of an IEEE 802.11-based wireless LAN monitors the state of the wireless LAN using a mobile terminal and directly makes a wireless attack against the network, thereby analyzing the vulnerability of the wireless LAN that is being managed by the administrator.

2. Description of the Related Art

IEEE 802.11-based wireless LAN technology is being widely used in homes, companies and public networks because the technology enables terminals to use networks inexpensively and rapidly without requiring wired connections.

In particular, as notebook computers equipped with wireless LAN cards, smart phones, and tablets are being widely used, users can use at any time or any place various types of Internet-based application services, such as web surfing, news access, social service networking, e-mail exchange, etc.

Meanwhile, as high-speed provision technology, such as 802.11n and 802.11ac, and security enhancement wireless LAN technology, such as 802.11i, and 802.11w, have appeared, securer and more convenient wireless LAN technology has become available.

However, although security enhancement technology is applied to a wireless LAN, there is still vulnerability attributable to the characteristics of wireless technology.

Unlike wired technology, wireless technology is problematic in that anybody can access a wireless network and in that a wireless network is exposed to various types of attacks (e.g., falsification of an address, tapping, and the forging of packets) because it is difficult to find the actual physical location of a network access point.

In order to safely manage wireless LANs that are subject to such various attacks, there are various conventional technologies.

First, a method using WIDS/WIPS sensors is used to detect and handle intrusions. These sensors function to continuously collect wireless LAN packets, detect such an attack, and handle the attack at fixed locations.

Second, a method of analyzing and managing a network using a portable terminal is used. This terminal has a form that can be easily carried by an administrator, and functions to collect wireless LAN packets at a location desired by the administrator, check the state of a network, and determine whether the quality of the network is normal. Some products include the function of the above-described sensors.

Third, there is a method in which an attack function has been added to the second technology and thus the vulnerability of a network can be checked. In connection with this, Korean Patent No. 0520103 discloses a vulnerability analysis system including SSID modification attack and 802.1x-based denial-of-service (DoS) attack functions.

The first and second methods cannot determine an attack to which a currently established system is vulnerable because the vulnerability analysis systems do not check the states of the system and the network while making attacks in an active manner.

Meanwhile, although the third method is advantageous in that an administrator can analyze the vulnerability of a system in an active manner, it is disadvantageous in that the number of attacks is limited and there is no function of operating in conjunction with other systems (such as an AP, an intrusion detection sensor, and a server).

As a result, there is a need for the development of technology that is capable of stably managing wireless LANs that are subject to various attacks.

SUMMARY OF THE INVENTION

Accordingly, the present invention has been made keeping in mind the above problems occurring in the conventional art, and an object of the present invention is to provide technology that includes the functions of analyzing the state of a wireless network, detecting various types of attacks and intrusions, and making reports in conjunction with an AP and a server in a portable user terminal, thereby enabling a network administrator to easily analyze the vulnerability of a wireless LAN being managed and to make a wireless LAN environment safe.

In accordance with an aspect of the present invention, there is provided an apparatus for analyzing the vulnerability of a wireless LAN, including a collection unit configured to collect packets transmitted and received in a wireless LAN service; an analysis unit configured to analyze a state of a network using the collected packets; and an attack unit configured to make a wireless attack against an attack target using the state of the network, and to control the mode switching of a device driver based on an operating mode.

The device driver may operate in any one of a monitoring mode for checking all the packets of a specific wireless channel, an illegal access point (AP) mode for operating as an illegal AP, a terminal mode for connecting to an AP or for setting up an ad-hoc connection as a terminal, and an attack mode for forging packets in order to make an attack.

When the device driver operates in an attack mode, the attack unit may command the device driver to transmit deauthentication packets in which the MAC addresses of an AP and a terminal, a connection between which needs to be released, have been forged as transmission and reception addresses.

The collection unit may receive one or more collection policies including collection channel scheduling information, collection frame type information and collection time information, may receive wireless packets based on the collection policies, and may transfer the collected information to units from which that the collection policies were received.

The analysis unit may store one or more policies set by a user through a user interface, may download one or more collection policies to the collection unit pursuant to the set policies, and may process the information received from the collection unit and output the results of analysis to the user through the user interface.

The results of the analysis may include the state of each wireless channel, AP information, terminal information, a connection state, wireless frame type information, and error rate information.

The apparatus may further include a detection unit configured to detect an attack situation using the packets; a countermeasure unit configured to block the access of an attacker based on the results of the detection; a normal terminal unit configured to evaluate the attack situation, and to support an improved attack; and a server connection unit configured to transmit and receive security information to and from a security-related server.

The detection unit may store one or more policies set by a user via a user interface, may download one or more collection policies to the collection unit pursuant to the set policies, and may detect the pattern of an attack using the information received from the collection unit.

The pattern of the attack may be any one of an illegal wireless AP, a denial-of-service (DoS) attack, and a WEP/WPA key pattern.

The countermeasure unit may perform control so that the device driver is switched to an operating mode corresponding to the pattern of the attack pattern in accordance with the pattern of the attack.

When the normal terminal unit operates as a normal terminal in a victim mode for accepting a wireless attack, the attack unit may attract access as an illegal AP that has copied after a normal AP, or may attempt to make a DoS attack or key hacking against the normal terminal unit that has normally established a wireless connection with a normal AP.

The normal terminal unit may access a normal AP as a normal terminal and then transmit a right to access to the attack unit; and the attack unit may attempt an insider attack while maintaining a connection to the normal AP without change using the right to access.

The insider attack may be any one of an 802.11i MIC failure attack, a wireless LAN layer attack, and an Internet layer attack.

The right to access may include shared key information and the MAC address of a connected wireless LAN card.

The server connection unit may transmit and receive information about the authentication of a user and a terminal to and from an authentication server.

The server connection unit may receive a normal AP list, and detection and countermeasure policies, and may report the results of the detection and handling of an attack.

The server connection unit may receive information about the drawings of actual locations and installation places of one or more installed APs and sensors from a security control server, and may transfer the information about drawings to the analysis unit; and the analysis unit may analyze information about the quality of the wireless LAN at a specific location, and may transfer the results of the analysis to the security control server.

The detection unit may analyze the results of the analysis, may generate a white list of normal APs, and may detect an illegal AP using the white list.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
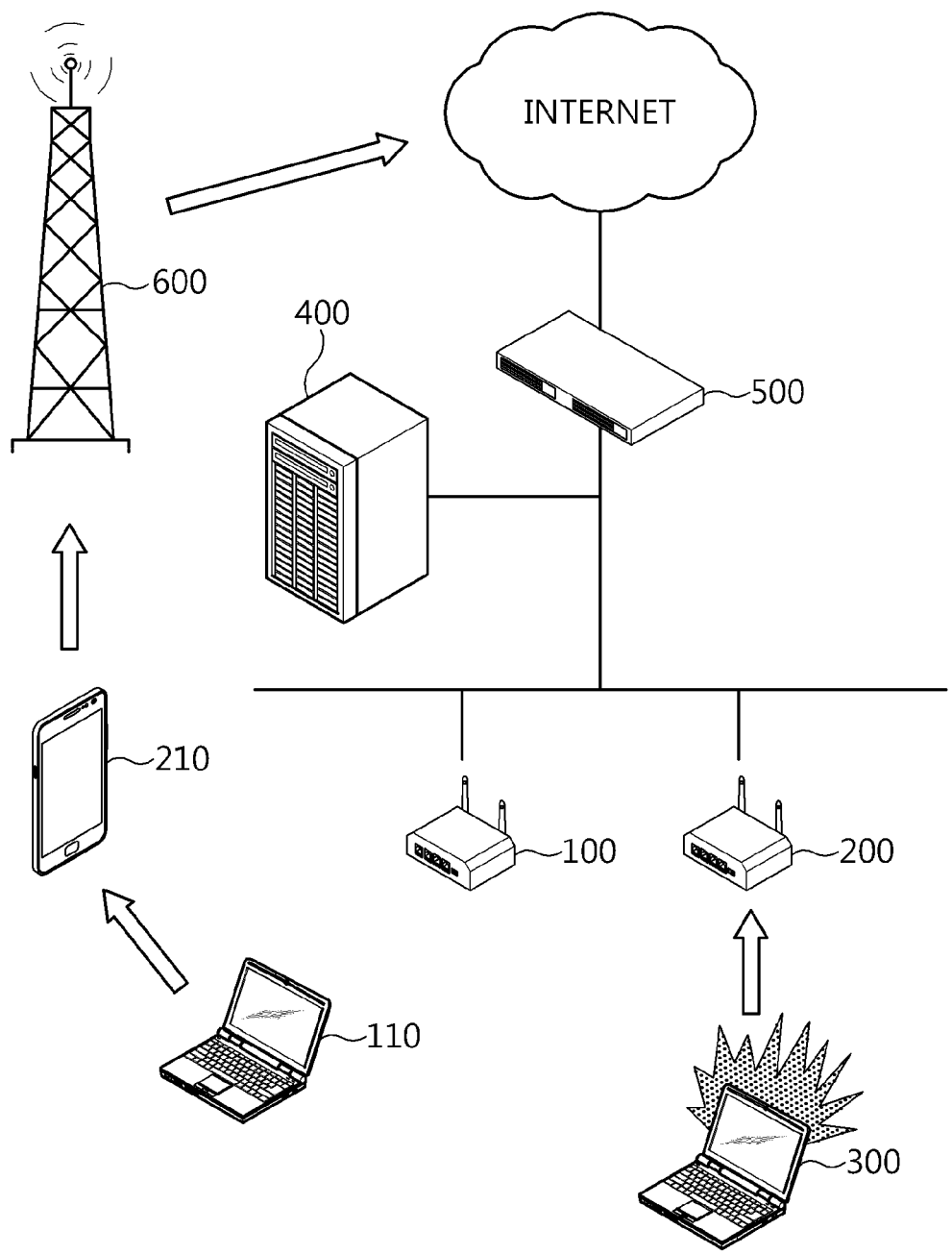
FIG. 1 is a diagram illustrating a process of attacking a wireless LAN using an illegal AP according to an embodiment of the present invention.

The present invention will be described in detail below with reference to the accompanying drawings. Repeated descriptions and descriptions of known functions and configurations which have been deemed to make the gist of the present invention unnecessarily vague will be omitted. The embodiments of the present invention are intended to fully describe the present invention to a person having ordinary knowledge in the art. Accordingly, the shapes, sizes, etc. of elements in the drawings may be exaggerated to make the description clear.

Embodiments of the present invention will be described in detail with reference to the accompanying drawings.

FIG. 1 is a diagram illustrating a process of attacking a wireless LAN using an illegal AP according to an embodiment of the present invention.

The term "illegal Access Points (APs)" collectively refers to APs that are illegally installed and used with authorization. Illegal APs may be classified into two types.

The first types of APs are illegal APs that are connected to the intranets of companies via wired connections and provide wireless LAN service. These types of illegal APs are used as means via which attackers bypass firewalls and wired IDSs/IPSs and easily access the intranet of companies.

An illegal AP 1 200 is connected to the intranet of a company via a wired connection, and thus provides an illegal path via which an attacker 300 can easily access the intranet in a wireless manner.

In this case, although the attacker has no right to access the intranet, the attacker can easily access a server 400 or a PC that stores the important information of the company.

The second types of APs are those that are connected to the Internet using various methods, such as tethering, a soft AP and the like. These types of APs provide wireless LAN service like normal APs, but may become a means via which an attack that steals information by tapping or forging data exchanged between connected terminals may be attempted.

A normal terminal 110 may access a smart phone 210 that is providing a tethering service, rather than gaining access via a normal AP 100, and may then receive an Internet service via a mobile communication base station 600.

In principle, terminals within a company should access an external network via an internal gateway 500, in which case it is possible to establish a system in which an administrator can prevent the illegal divulgence of data. In the case of the illegal AP 2 210 using such a tethering smart phone, the administrator has no means that is capable of preventing the illegal divulgence of data via an internal terminal.

Figure 2:
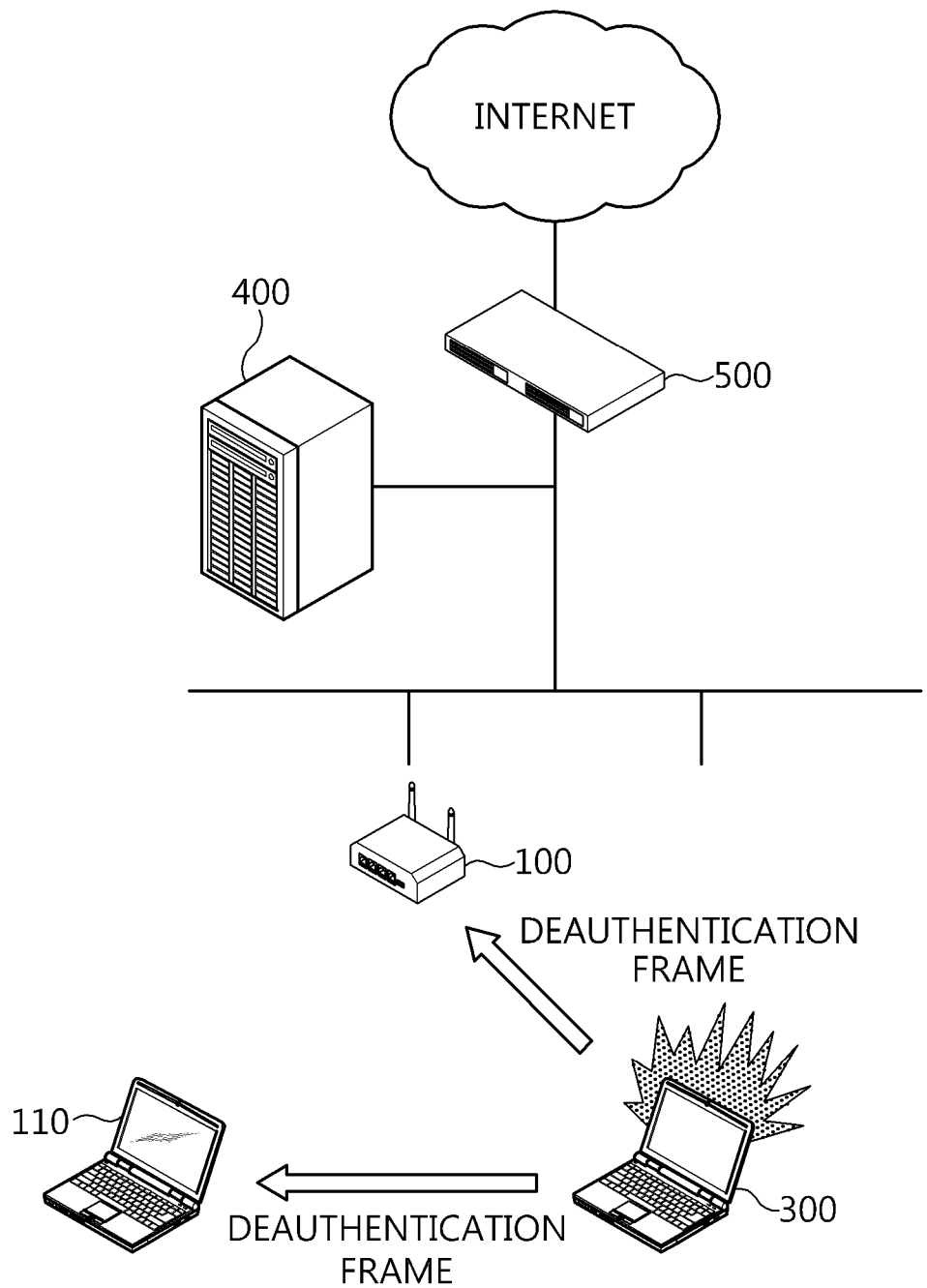
FIG. 2 is a diagram illustrating a process of making an LAN attack using a DoS method according to an embodiment of the present invention.

FIG. 2 is a diagram illustrating a process of making an LAN attack using a DoS method according to an embodiment of the present invention.

When attempts to transmit a plurality of pieces of data over a wireless LAN are made, various types of wireless packets are defined and used to avoid a collision and maintain a virtual connection between a terminal and an AP.

Although these packets are very effective in achieving the above purposes when the packets are legitimately generated and used, it may be impossible to maintain a connection between a normal terminal and an AP when the packets are forged and illegitimately used. An attack corresponding to this situation is referred to as a DoS attack.

DoS attacks may be made over a wireless LAN using various methods.

The attacker 300 may cause a connection between the terminal 110 and the normal AP 100 to be released by forging the transmission and reception addresses of a deauthentication frame message and transferring the deauthentication frame message to the terminal 110 and the normal AP 100.

Furthermore, the normal AP 100 may be caused not to provide normal wireless LAN service by generating a large number of association messages in which transmission addresses have been forged and then paralyzing the connection information management function of the normal AP 100.

Additionally, a DoS attack may be attempted by forging a management frame using another method, by forging EAPOL messages (such as an EAPOL-start, an EAPOL-logoff, an EAPOL/EAP-failure, EAPOL/EAP-success, etc.) that are essential to a wireless LAN service for which 802.1x-based user authentication is used, or by forging control packets (RTS/CTS, NAV, etc.) that are constructed to avoid collisions on a wireless LAN.

Meanwhile, other wireless LAN attack methods include a WEP/WPA key hacking attack method and a method of insider attack via a normally connected terminal.

In the case of a WEP/WPA key hacking attack method, a wireless LAN includes technology that encrypts data packets using a key that is agreed with an AP via shared key or 802.1x in order to prevent tapping, which includes WEP, WPA, and WPA2 technologies in this case.

Among these technologies, WEP is most vulnerable to a key hacking attack, and WPA and WPA2 are also subject to key hacking attacks.

In the method of an insider attack via a normally connected terminal, a normal terminal that has been normally authenticated and has been safely connected to a wireless LAN may attempt an insider attack.

These attacks may be classified into attacks using the vulnerability of the wireless LAN specifications and attacks that are made above the wireless LAN layer.

In an example of an attack using the vulnerability of the wireless LAN specifications, terminals that have been safely connected to the same AP using WPA/WPA2 all share the same broadcast key.

This broadcast key encrypts a broadcast message of an AP. If there is an error in the message integrity code (MIC) of the encrypted message, the AP attempts new key sharing or terminates a connection.

Accordingly, when a normal terminal manipulates and transmits a frame that generates an MIC failure, the effect of a DoS attack is achieved. This type of attack is made in a similar manner in 802.11w, which is a standard for the protection of management frames.

An example of an attack that is made above a wireless LAN layer is an ARP Poisoning attack that is made in such a way that a terminal connected to an AP transmits an ARP message to a terminal connected to the same AP. For example, if a normally connected attacker transmits a forged ARP message asserting that the attacker is a gateway to another terminal, the other terminal will transmit all Internet packets to be transmitted to the outside to the attacker. Although this attack is made in a layer above an Internet layer, forged packets do not reach wired IDS/IPS equipment connected to the outside of a network, and thus it is very difficult to effectively handle such an attack.

Figure 3:
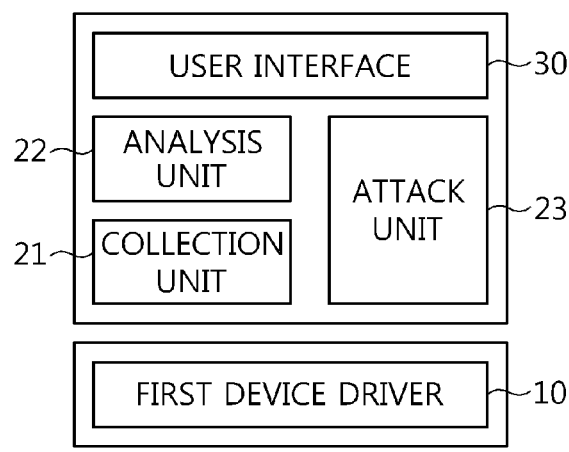
FIG. 3 is a diagram illustrating the configuration of an apparatus for analyzing the vulnerability of a wireless LAN according to an embodiment of the present invention.

FIG. 3 is a diagram illustrating the configuration of an apparatus for analyzing the vulnerability of a wireless LAN according to an embodiment of the present invention.

Referring to FIG. 3, the apparatus for analyzing the vulnerability of a wireless LAN according to this embodiment of the present invention includes a first device driver 10, a collection unit 21, an analysis unit 22, an attack unit 23, and a user interface 30.

The apparatus for analyzing the vulnerability of a wireless LAN may be combined with a mobile terminal, such as a notebook computer or a smart phone, in the form of being contained in the mobile terminal, and may analyze the vulnerability of a wireless LAN in a place where general wireless LAN service is provided.

The first device driver 10 is provided by a wireless LAN card manufacturing company or a wireless LAN chipset manufacturing company, and supports various modes in order to capture a wireless packet, perform transmission, and make access.

These modes may include a monitoring mode for checking all the packets of a specific wireless channel, an AP mode for operating as an AP, a terminal mode for connecting to an AP or setting up an ad-hoc connection as a terminal, and an attack mode for forging packets in order to make an attack.

The collection unit 21 collects packets that are transmitted and received in a wireless LAN service.

The collection unit 21 may switch the first device driver 10 to the monitoring mode, and may then set a desired wireless channel.

In this case, the collection unit 21 may receive all packets that are transmitted via a specific wireless channel. The collection unit 21 may download collection policies, such as collection channel scheduling information, collection frame type information, and collection time information, from other units, such as the analysis unit 22 and the attack unit 23, may receive wireless packets pursuant to the received policies, and may transfer the collected information to the units from which that the policies were downloaded.

The analysis unit 22 analyzes the state of a wireless LAN using the information collected by the collection unit 21, and reports the results of the analysis to an administrator.

The analysis unit 22 may store one or more policies set by a user through the user interface 30, may download one or more collection policies to the collection unit 21 pursuant to the set policies, and may process the information received from the collection unit 21 and output the results of the analysis to the user through the user interface 30 in various forms.

The results of the analysis may include various types of information, such as information about the state of each wireless channel, AP information, terminal information, connection state, the wireless frame type, and the error rate, with respect to the wireless channel.

In this case, the information about the state of each channel may include channel information, signal strength, throughput, noise ratio, interference status and/or the like.

In this case, the AP information may include a MAC address, an SSID, a security state, transmission and reception packet information, connected terminal information, and/or the like.

In this case, the terminal information may include a MAC address, connected AP information, transmission and reception time and/or the like.

In this case, the results of the analysis obtained by the analysis unit 22 may be used as basic information when the user attempts to issue an attack command using the attack unit via the user interface 30.

For example, the analysis unit 22 may command the attack unit 23 to make an illegal AP attack that offers service in the same manner as an analyzed AP based on information about the analyzed AP.

The attack unit 23 may attempt to make a wireless attack against an overall adjacent wireless network, a specific AP or a specific terminal independently or using the analyzed state of a network.

The attack unit 23 functions to carry out an attack command when the user attempts the attack command via the user interface 30.

When operating as an illegal AP, the first device driver 10 should operate in an AP mode. When attempting to make an attack against a network or an AP, the first device driver 10 should operate in an attack mode.

In this case, when an attack mode is set, the attack unit 23 should freely forge packets in accordance with the type of attack that is desired by the user.

That is, in the case of a DoS attack using a deauthentication frame, the first device driver 10 may be commanded to transmit deauthentication packets in which the MAC addresses of an AP and a terminal, the connection between which needs to be released, have been forged as transmission and reception addresses.

Figure 4:
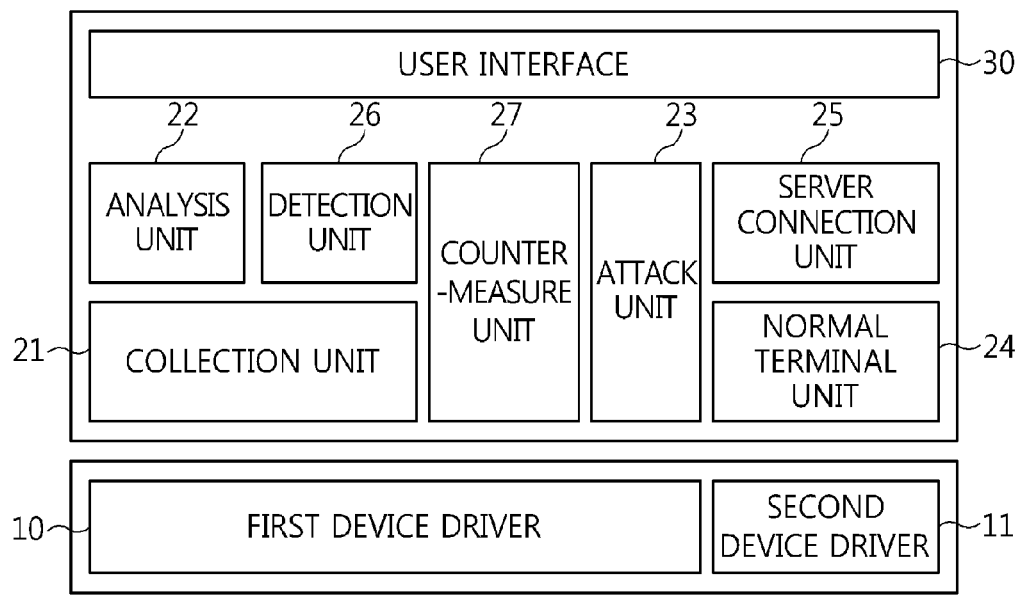
FIG. 4 is a diagram illustrating the configuration of an apparatus for analyzing the vulnerability of a wireless LAN according to an embodiment of the present invention.

FIG. 4 is a diagram illustrating the configuration of an apparatus for analyzing the vulnerability of a wireless LAN according to an embodiment of the present invention.

Referring to FIG. 4, the apparatus for analyzing the vulnerability of a wireless LAN according to this embodiment of the present invention includes the first device driver 10, the collection unit 21, the analysis unit 22, the attack unit 23 and the user interface 30, described in detail with reference to FIG. 3, and further includes a second device driver 11, a normal terminal unit 24, a server connection unit 25, a detection unit 26, and a countermeasure unit 27.

The first device driver 10, the collection unit 21, the analysis unit 22, the attack unit 23, and the user interface 30 have been described with reference to FIG. 3, and detailed descriptions identical to those given with reference to FIG. 3 will be omitted.

The detection unit 26 detects an adjacent attack situation using information that is collected by the collection unit 21.

The detection unit 26 may store one or more policies set by the user via the user interface 30, like the analysis unit 22, may download one or more collection policies to the collection unit 21 pursuant to the set policies, and may detect attack-related information, such as an illegal wireless AP, a DoS attack, WEP/WPA key hacking, or the like, using the information received from the collection unit 21.

These detection policies should be downloaded from the server connection unit 25 or should be directly stored by the user via the user interface 30.

The countermeasure unit 27 blocks the access of an attacker based on the results of the detection that are obtained via the detection unit 26.

The countermeasure unit 27 may take countermeasures to prevent specific attacks from being made any longer when attacks are detected via the detection unit 26.

Since countermeasures against a wireless attack are to make an attack against the attacker in a reverse manner, the first device driver 10 should operate in an attack mode in the same manner as the attack unit 23.

For example, when the presence of an illegal AP is detected, a deauthentication frame or a disassociation frame requesting all terminals and illegal APs connected to the illegal AP to release connections pursuant to one or more countermeasure policies may be transmitted.

The normal terminal unit 24 may directly check the effect of an attack or attempt a more improved type of attack.

In this case, the normal terminal unit 24 plays the following two roles.

First, the normal terminal unit 24 may play a role as a victim of a wireless attack.

In this case, the attack unit 23 attracts access as an illegal AP that has copied after a normal AP, or attempts to make a DoS attack, key hacking or the like against a normal terminal unit that has normally established a wireless connection with a normal AP.

In this case, it may be possible to analyze the degree of ease of an attack and report that a security problem may occur if an attack can be made at a level lower than a specific reference.

Second, the normal terminal unit 24 may play a role in accessing a normal AP as a normal terminal and then handing over the right to access to the attack unit 23.

In this case, the right to access may include shared key information, the MAC address of a connected wireless LAN card, etc.

If the attack unit 23 utilizes information about the right to access, the attack unit 23 may attempt an insider attack while maintaining the connection to the normal AP without change.

As described above, an 802.11i MIC failure attack or a similar wireless LAN layer (layer 2) attack may be attempted, or an Internet (layer 3) or higher layer attack, such as an ARP poisoning attack or malware transmission, may be attempted.

The normal terminal unit 24 uses a card that is separate from a wireless LAN card that is used by the collection unit 21.

Accordingly, the normal terminal unit 24 uses a separate device driver, which corresponds to the second device driver 11 of FIG. 4. The second device driver 11 operates in a terminal mode.

The server connection unit 25 may connect to external servers, such as another authentication server, a control server, and the like, and may exchange various types of information, such as vulnerability handling policies, with them, thereby improving the level of vulnerability handling.

The server connection unit 25 may include the function of connecting to various types of internal security-related servers, and may exchange information with them.

For example, the server connection unit 25 may transfer information about the authentication of the user and the terminal to an authentication server, and may receive a normal AP list, detection and countermeasure policies and the like from a security control server. In a reverse manner, the server connection unit 25 may report the results of the detection and handling of an attack.

Furthermore, the server connection unit 25 may receive information about drawings of the actual locations and installation places of one or more installed APs and sensors from the security control server and transfer the information about drawings to the analysis unit 22, and the analysis unit 22 may analyze information about the quality of a wireless LAN at a specific location and transfer the results of the analysis back to the security control server.

In this case, the detection unit 26 may detect an illegal AP by using the results of the analysis of the analysis unit 22 as a white list of normal APs.

Furthermore, the server connection unit 25 may receive connection information from the user interface 30, and may connect to the external server via the normal terminal unit 24 and the wireless second device driver 11 or using a separate network interface.

The present invention is advantageous in that a wireless LAN administrator can easily carry the apparatus of the present invention and can conveniently analyze and manage the state of a wireless LAN using the apparatus.

Furthermore, the present invention is advantageous in that a wireless LAN administrator can attempt to make a direct attack against a wireless LAN, thereby checking the wireless LAN for vulnerability in an active manner.

Furthermore, the present invention is advantageous in that the level of handling vulnerability can be improved by being combined with an intrusion detection and handling function or a normal terminal function or by connecting to an external server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for analyzing vulnerability of a wireless local area network, comprising:
   a collection unit configured to collect packets transmitted and received in a wireless local area network service;
   an analysis unit configured to analyze a state of a network using the collected packets; and
   an attack unit configured to make a wireless attack against an attack target using the state of the network, and to control switching an operating mode of a device driver that receives the packets from the wireless local area network.

2. The apparatus of claim 1, wherein the device driver operates in any one of a monitoring mode for checking all the packets of a specific wireless channel, an illegal access point mode for operating as an illegal access point a terminal mode for connecting to an access point or for setting up an ad-hoc connection as a terminal, and an attack mode for forging packets in order to make an attack.

3. The apparatus of claim 2, wherein, when the device driver operates in an attack mode, the attack unit commands the device driver to transmit deauthentication packets in which MAC addresses of an access point and a terminal, a connection between which needs to be released, have been forged as transmission and reception addresses.

4. The apparatus of claim 1, wherein the collection unit receives one or more collection policies including collection channel scheduling information, collection frame type information and collection time information, receives wireless packets based on the collection policies, and transfers the collected information to units from which that the collection policies were received.

5. The apparatus of claim 1, wherein the analysis unit stores one or more policies set by a user through a user interface, downloads one or more collection policies to the collection unit pursuant to the set policies, and processes the information received from the collection unit and outputs results of analysis to the user through the user interface.

6. The apparatus of claim 5, wherein the results of the analysis comprise a state of each wireless channel, access point information, terminal information, a connection state, wireless frame type information, and error rate information.

7. The apparatus of claim 1, further comprising:
   a detection unit configured to detect an attack situation using the packets;
   a countermeasure unit configured to block access of an attacker based on the results of the detection;
   a normal terminal unit configured to evaluate the attack situation, and to support an improved attack; and
   a server connection unit configured to transmit and receive security information to and from a security-related server.

8. The apparatus of claim 7, wherein the detection unit stores one or more policies set by a user via a user interface, downloads one or more collection policies to the collection unit pursuant to the set policies, and detects a pattern of an attack using the information received from the collection unit.

9. The apparatus of claim 8, wherein the pattern of the attack is any one of an illegal wireless access point, a denial-of-service attack, and a WEP/WPA key pattern.

10. The apparatus of claim 7, wherein the countermeasure unit performs control so that the device driver is switched to an operating mode corresponding to the pattern of the attack pattern in accordance with the pattern of the attack.

11. The apparatus of claim 7, wherein:
    when the normal terminal unit operates as a normal terminal in a victim mode for accepting a wireless attack,
    the attack unit attracts access as an illegal access point that has copied after normal access point, or attempts to make a denial-of-service attack or key hacking against the normal terminal unit that has normally established a wireless connection with a normal access point.

12. The apparatus of claim 7, wherein:
    the normal terminal unit accesses a normal access point as a normal terminal and then transmits a right to access to the attack unit; and
    the attack unit attempts an insider attack while maintaining a connection to the normal access point without change using the right to access.

13. The apparatus of claim 12, wherein the insider attack is any one of an 802.11i message integrity code failure attack, a wireless local area network layer attack, and an internet layer attack.

14. The apparatus of claim 12, wherein the right to access comprises shared key information and a MAC address of a connected wireless local area network card.

15. The apparatus of claim 7, wherein the server connection unit transmits and receives information about authentication of a user and a terminal to and from an authentication server.

16. The apparatus of claim 7, wherein the server connection unit receives a normal access point list, and detection and countermeasure policies, and reports results of the detection and handling of an attack.

17. The apparatus of claim 7, wherein:
    the server connection unit receives information about drawings of actual locations and installation places of one or more installed access points and sensors from a security control server, and transfers the information about drawings to the analysis unit; and
    the analysis unit analyzes information about quality of the wireless local area network at a specific location, and transfers results of the analysis to the security control server.

18. The apparatus of claim 17, wherein the detection unit analyzes the results of the analysis, generates a white list of normal access points, and detects an illegal access point using the white list.

* * * * *